United States Patent
Tamizhmani et al.

(10) Patent No.: US 12,174,808 B2
(45) Date of Patent: Dec. 24, 2024

(54) REDUCING A NUMBER OF UNITS IN A DATA POPULATION BASED ON PREDEFINED CONSTRAINTS

(71) Applicant: Bank of America Corporation, Charlotte, NC (US)

(72) Inventors: Aravinthane Tamizhmani, Chennai (IN); Sandeep Pai, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 51 days.

(21) Appl. No.: 18/163,784

(22) Filed: Feb. 2, 2023

(65) Prior Publication Data

US 2024/0264987 A1 Aug. 8, 2024

(51) Int. Cl.
*G06F 16/215* (2019.01)

(52) U.S. Cl.
CPC .................. *G06F 16/215* (2019.01)

(58) Field of Classification Search
CPC ..................................... G06F 16/215
USPC ........................................ 707/700
See application file for complete search history.

(56) References Cited

U.S. PATENT DOCUMENTS

| | | | |
|---|---|---|---|
| 8,041,670 B2 | 10/2011 | Bakalash et al. | |
| 8,051,102 B2 | 11/2011 | Everett | |
| 8,170,984 B2 | 5/2012 | Bakalash et al. | |
| 8,266,121 B2 | 9/2012 | Roitblat et al. | |
| 8,923,630 B2 | 12/2014 | Guo et al. | |
| 8,935,232 B2 | 1/2015 | Abadi et al. | |
| 9,026,518 B2 | 5/2015 | Rhinelander et al. | |
| 9,141,676 B2 | 9/2015 | Lysne et al. | |
| 9,348,877 B2 | 5/2016 | Ramani et al. | |
| 9,792,327 B2 | 10/2017 | Chang et al. | |
| 9,858,280 B2 | 1/2018 | Lee et al. | |
| 11,042,569 B2 | 6/2021 | Ramaiyer | |
| 2008/0288416 A1* | 11/2008 | Arnott ................... | G06Q 40/12 711/E12.001 |
| 2014/0236953 A1* | 8/2014 | Rapaport .............. | G06F 16/285 707/740 |
| 2016/0179910 A1* | 6/2016 | Karmarkar ........... | G06F 16/248 707/722 |

(Continued)

FOREIGN PATENT DOCUMENTS

TW 410304 B 11/2000

*Primary Examiner* — Hosain T Alam
*Assistant Examiner* — Nicholas E Allen

(57) ABSTRACT

A method includes receiving a data population and a plurality of constraints. The data population includes a plurality of units. Each unit includes a plurality of respective values. Each value corresponds to a respective parameter. Each constraint corresponds to a respective parameter. A holistic feature of the data population is determined. A volume is defined in the parameter space based on the plurality of constraints. For each unit of a current data population, a first vector representing a respective unit is subtracted from a second vector representing a current holistic feature to determine a third vector. For each third vector, a distance between a point defined by a respective third vector and the volume is determined. A minimum distance is determined from determined distances. The current data population is transformed into an updated data population by removing a unit that corresponds to the minimum distance from the current data population.

14 Claims, 2 Drawing Sheets

(56) References Cited

U.S. PATENT DOCUMENTS

| | | | |
|---|---|---|---|
| 2016/0188734 A1* | 6/2016 | Morley | G06F 16/9535 |
| | | | 707/734 |
| 2021/0011920 A1* | 1/2021 | Sudarsan | G06F 16/243 |
| 2021/0182241 A1 | 6/2021 | Dageville et al. | |
| 2022/0035815 A1 | 2/2022 | Jeong et al. | |
| 2022/0083814 A1* | 3/2022 | Weese | G06F 18/2193 |
| 2022/0084052 A1* | 3/2022 | Sheppard | G06Q 30/0205 |
| 2022/0237520 A1* | 7/2022 | Wang | G06N 20/00 |
| 2022/0300736 A1* | 9/2022 | Malur Srinivasan | G06N 3/08 |
| 2022/0343137 A1* | 10/2022 | Surendran | G06N 3/063 |
| 2022/0384048 A1* | 12/2022 | Gopalakrishnan | G16H 50/20 |
| 2023/0033317 A1* | 2/2023 | Lin | H04L 63/1433 |

\* cited by examiner

US 12,174,808 B2

REDUCING A NUMBER OF UNITS IN A DATA POPULATION BASED ON PREDEFINED CONSTRAINTS

TECHNICAL FIELD

The present disclosure relates generally to data manipulation, and more specifically to a system and method for reducing a number of units in a data population based on predefined constraints.

BACKGROUND

A data population including a plurality of units may have an overall feature (also referred to as a holistic feature) that can be determined from individual features of all of the units of the data population. The holistic feature of the data population may be different from a desired holistic feature. Accordingly, it may be needed to determine a subset of the units, such that the subset of the units has the desired holistic feature.

SUMMARY

The system described in the present disclosure provides several practical applications and technical advantages that overcome the current technical problems with determining a subset of units of a data population, such that the subset of units has a desired holistic feature that is within predefined constraints. The system described in the present disclosure provides a technical solution to the technical problems discussed above by determining a holistic feature of a data population; and removing units from the data population and determining updated holistic features until a resulting subset of the population has the final holistic feature that is within predefined constraints. By reducing the data population to a small subset based on the determination of holistic features, the described system reduces the consumption of resources related to computer systems, communication networks, memory and storage capacity, and other underlying computer technologies.

The technical solution to the technical problems discussed above has applications in areas such as polling, where a desired polling sample of a polled population is generated based on a desired holistic feature. The desired holistic feature can be an overall political lean of the population, for example. The final data population may include data for a maximum number of persons that have the overall political lean within predefined constraints.

The technical solution to the technical problems discussed above has further applications in areas such as computing systems having a plurality of computing nodes, where a desired subset of computing nodes has a desired holistic feature. The desired holistic feature can be an overall memory consumption, an overall network bandwidth, and/or an overall computing performance of the computing system, for example. The final data population may include data for a maximum number of computing nodes that have the overall memory consumption within predefined constraints, the overall network bandwidth within predefined constraints, and/or the overall computing performance within predefined constraints. For example, the final data population may include data for a maximum number of computing nodes that have a reduced overall memory consumption and/or reduced overall network bandwidth compared to the original data population, while the overall computing performance is within predefined constraints (for example, substantially unchanged compared to the original data population). Accordingly, by determining the maximum number of computing nodes based the desired holistic feature, computing resources (e.g., memory and/or network bandwidth) may be reduced while maintaining computing performance of the computing system substantially unchanged.

The technical solution to the technical problems discussed above has further applications in areas such as a portfolio management, where specific management strategies could be adopted for a subset of a population of shares that has a desired holistic feature. The desired holistic feature can be an overall projected gain of the shares, for example. The final data population may include data for a maximum number of shares that have the overall projected gain within predefined constraints.

Accordingly, the following disclosure is particularly integrated into practical applications of: (1) improving portfolio management; (2) improving sampling of a population; and (3) reducing computing resources (e.g., memory and/or network bandwidth) of a computing system while maintaining computing performance of the computing system substantially unchanged.

In one embodiment, a system includes a memory and a processor communicatively coupled to the memory. The memory is configured to store a data population and a plurality of constraints. The data population includes a plurality of units. Each unit includes a plurality of respective values. Each value corresponds to a respective parameter. Each constraint corresponds to a respective parameter. The processor is configured to receive the data population; receive the plurality of constraints; represent the units of the data population by first vectors in a parameter space; determine a holistic feature of the data population; represent the holistic feature by a second vector in the parameter space, wherein the second vector is a linear combination of the first vectors; define a volume in the parameter space based on the plurality of constraints; for each unit of a current data population, subtract a vector representing a respective unit from a vector representing a current holistic feature to determine a third vector, wherein the vector representing the current holistic feature is a linear combination of vectors that represent units of the current data population; for each third vector, determine a distance between a point defined by a respective third vector and the volume; determine a minimum distance from determined distances; transform the current data population into an updated data population by removing a unit that corresponds to the minimum distance from the current data population; and determine an updated holistic feature of the updated data population.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
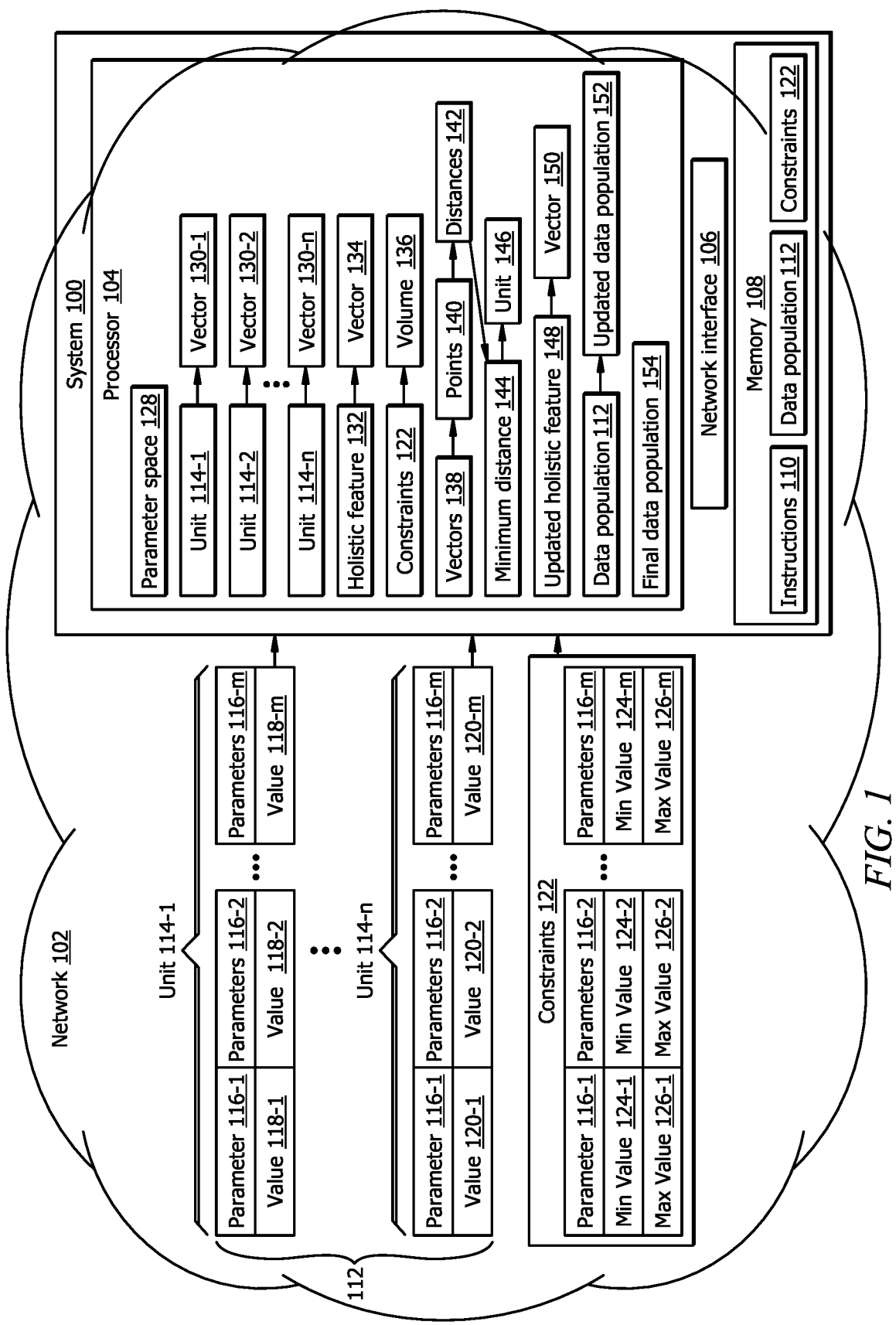
FIG. 1 illustrates an embodiment of a system configured to reduce a number of units in a data population based on predefined constraints.
Figure 2:
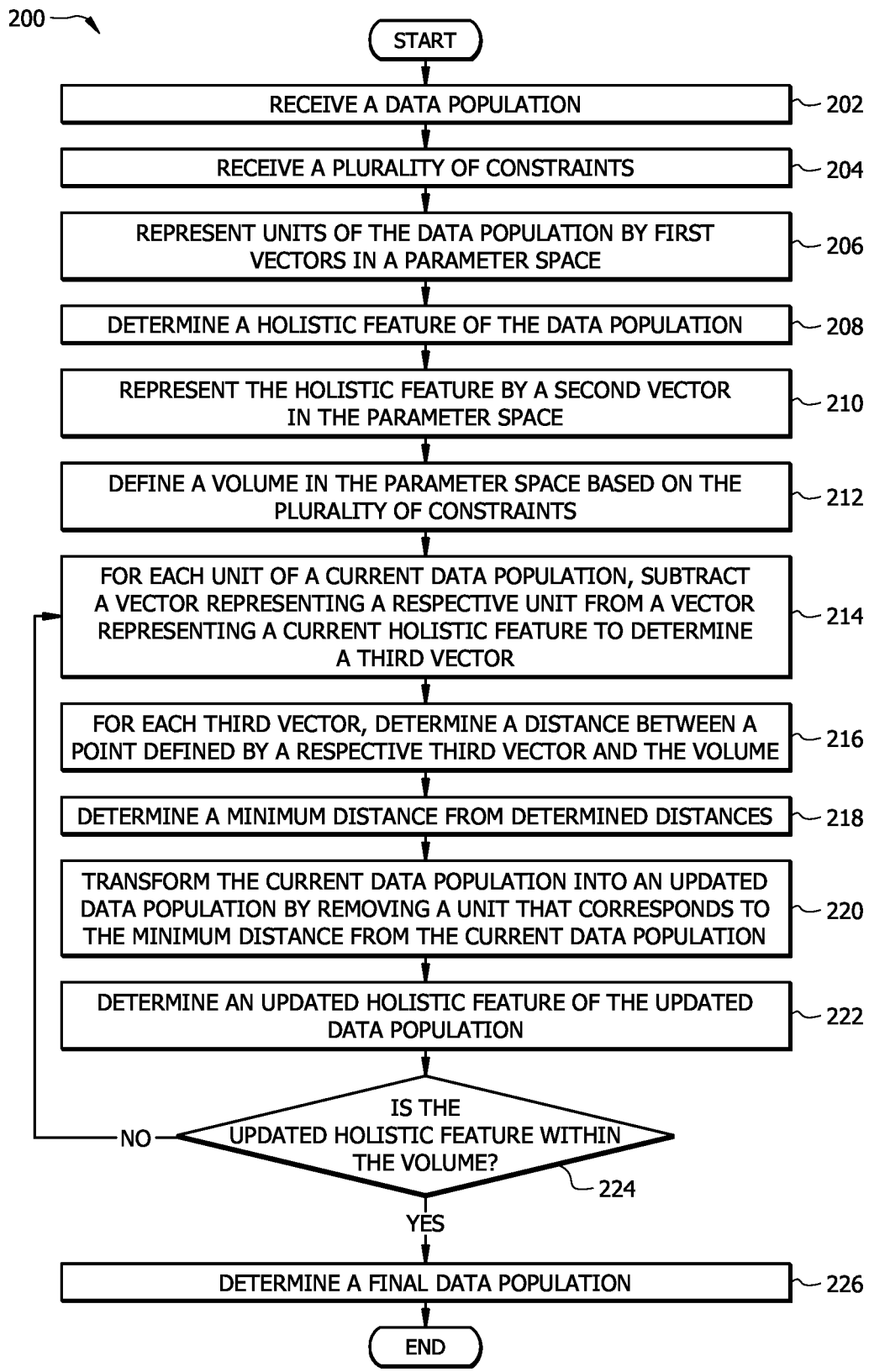
FIG. 2 illustrates an example operational flow of system of FIG. 1 for reducing a number of units in a data population based on predefined constraints.

As described above, previous technologies fail to provide an effective solution for a problem of identifying a subset of a data population that has a holistic feature within predefined constraints. Embodiments of the present disclosure and their advantages may be understood by referring to FIGS. 1 and 2. FIGS. 1 and 2 are used to describe a system and method for reducing a number of units in a data population based on predefined constraints.

System Overview

FIG. 1 illustrates an embodiment of a system 100 that is generally configured to reduce a number of units in a data population based on predefined constraints and obtain a subset of a data population that has a holistic feature that equals to a desired holistic feature within predefined constrains. The system 100 may be operably coupled to external systems via a network 102. In other embodiments, the system 100 may not have all the components listed and/or may have other elements instead of, or in addition to, those listed above.

In certain embodiments, the system 100 may be configured to determine an initial holistic feature of a data population; and remove units from the data population and determine updated holistic features until a resulting subset of the data population has the final holistic feature that equals to a desired holistic feature within predefined constrains.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

System for Reducing a Number of Units in a Data Population Based on Predefined Constraints The system 100 is generally any device that is configured to process and store data and communicate with external systems via the network 102. The system 100 may comprise a processor 104 in signal communication with a memory 108 and a network interface 106.

Processor 104 comprises one or more processors operably coupled to the memory 108. The processor 104 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 104 may be a programmable logic device, a microcontroller, a microprocessor, or any suitable combination of the preceding. The one or more processors are configured to process data and may be implemented in hardware or software. For example, the processor 104 may be 8-bit, 16-bit, 32-bit, 64-bit, or of any other suitable architecture. The one or more processors are configured to implement various software instructions to perform the operations described herein. For example, the one or more processors are configured to execute software instructions 110 and perform one or more functions described herein.

Network interface 106 is configured to enable wired and/or wireless communications (e.g., via network 102). The network interface 106 is configured to communicate data between the system 100 and other external systems. For example, the network interface 106 may comprise a WIFI interface, a local area network (LAN) interface, a wide area network (WAN) interface, a modem, a switch, or a router. The processor 104 is configured to send and receive data using the network interface 106. The network interface 106 may be configured to use any suitable type of communication protocol as would be appreciated by one of ordinary skill in the art.

Memory 108 may be volatile or non-volatile and may comprise a read-only memory (ROM), random-access memory (RAM), ternary content-addressable memory (TCAM), dynamic random-access memory (DRAM), and static random-access memory (SRAM). Memory 108 may be implemented using one or more disks, tape drives, solid-state drives, and/or the like. The memory 108 may store any of the information described in FIGS. 1 and 2 along with any other data, instructions, logic, rules, or code operable to implement the function(s) described herein when executed by the processor 104. The memory 108 is operable to store software instructions 110, and/or any other data and instructions. The software instructions 110 may comprise any suitable set of software instructions, logic, rules, or code operable to be executed by the processor 106.

The system 100 is configured to receive a data population 112 and store it in the memory 108. The data population 112 may include a plurality of units 114-1 through 114-$n$. Each unit of the data population 112 includes a plurality of values, such that each value corresponds to a respective parameter. For example, the unit 114-1 comprises values 118-1 through 118-$m$, such that the values 118-1 through 118-$m$ correspond to parameters 116-1 through 116-$m$, respectively. The unit 114-$n$ comprises values 120-1 through 120-$m$, such that the values 120-1 through 120-$m$ correspond to the parameters 116-1 through 116-$m$, respectively. In certain embodiments, the values 120-1 through 120-$m$ may be different from the values 118-1 through 118-$m$, respectively.

In certain embodiments, the data population 112 may include financial data for a plurality of shares and the plurality of parameters 116-1 through 116-$m$ may include financial parameters. In other embodiments, the data population 112 may include demographic data for a plurality of persons and the plurality of parameters 116-1 through 116-$m$ may include demographic parameters. In yet other embodiments, the data population 112 may include computing data for a plurality of computing nodes of a computing system and the plurality of parameters 116-1 through 116-*m* may include computing parameters (such as, for example, a computing performance, a memory, and/or a network bandwidth).

The system 100 is further configured to receive a plurality of constraints 122 and store it in the memory 108. The constraints 122 may include minimum and maximum values that correspond to respective parameters. For example, the constraints 122 include minimum values 124-1 through 124-*m* and maximum values 126-1 through 126-*m* corresponding to the parameters 116-1 through 116-*m*, respectively.

The system 100 is further configured to represent the units 114-1 through 114-*n* of the data population 122 by vectors 130-1 through 130-*n*, respectively, in a parameter space 128. The parameter space 128 may be a multi-dimensional space, such as an m-dimensional vector space, for example.

The system 100 is further configured to determine a holistic feature 132 of the data population 122. The holistic feature 132 may be determined from all of the units 114-1 through 114-*n* of the data population 122. In embodiments when the data population 112 includes financial data for a plurality of shares, the holistic feature 132 may be an overall projected gain. In embodiments when the data population 112 includes demographic data for a plurality of persons, the holistic feature 132 may be an overall political lean. In embodiments when the data population 112 includes computing data for a plurality of computing nodes of a computing system, the holistic feature 132 may be an overall memory consumption, an overall network bandwidth, and/or an overall computing performance.

The system 100 is further configured to represent the holistic feature 132 by a vector 134 in the parameter space 128. In certain embodiments, the vector 134 is a linear combination of the vectors 130-1 through 130-*n*.

The system 100 is further configured to determine a volume 136 in the parameter space 128 based on the plurality of constraints 122. The volume may have a shape of a multi-dimensional rectangle, which may be also referred to as a hyperrectangle or an orthotope.

The system 100 is further configured to determine vectors 138, such that each vector 138 is determined by subtracting a vector (e.g., a respective one of the vectors 130-1 through 130-*n*) representing a respective unit (e.g., a respective one of the units 114-1 through 114-*n*) from the vector 134 representing the holistic feature 132. The vectors 138 define respective points 140 in the parameter space 128.

The system 100 is further configured to determine distances 142, such that each distance 142 is a distance between a point 140 defined by a respective vector 138 and the volume 136, and a minimum distance 144 from the distances 142. The system 100 further determines a unit 146 that corresponds to the minimum distance 144. The unit 146 may be any of the units 114-1 through 114-*n*.

The system 100 is further configured to transform the data population 112 into an updated data population 152 by removing the unit 146 that corresponds to the minimum distance 144 from the data population 112.

The system 100 is further configured to determine an updated holistic feature 148 of the updated data population 152. The updated holistic feature 148 is represented by a vector 150, such that the vector 150 a linear combination of vectors that represent units of the updated data population 152. In an embodiment when the removed unit 146 is the unit 114-1, the vectors that represent units of the updated data population 152 comprise the vectors 114-2 through 114-*n*. In other words, the unit 146 is a unit of the data population 112 removal of which moves the vector 150 representing the updated holistic feature 148 closest to the volume 136. Accordingly, the updated holistic feature 148 is moved closest to a desired range defined by the constraints 122.

The system 100 is further configured to continue removing further units of the data population 112 as described above until the updated holistic feature 148 is within the volume 136. In other words, units of the data population 112 are removed until the updated holistic feature 148 is within a desired range defined by the constraints 122. The latest updated data population defines a final data population 154. The final data population 154 includes a maximum number of units that have a holistic feature that is within a desired range defined by the constraints 122.

In embodiments when the data population 112 includes financial data for a plurality of shares, the final data population 154 includes data for a maximum number of shares that have the overall projected gain within a desired range defined by the constraints 122. In embodiments when the data population 112 includes demographic data for a plurality of persons, the final data population 154 includes data for a maximum number of persons that have the overall political lean within a desired range defined by the constraints 122. In embodiments when the data population 112 includes computing data for a plurality of computing nodes of a computing system, the final data population 154 may include data for a maximum number of nodes that have the overall memory consumption within a desired range defined by the constraints 122, the overall network bandwidth within a desired range defined by the constraints 122, and/or the overall computing performance within a desired range defined by the constraints 122.

Example Method for Reducing a Number of Units in a Data Population Based on Predefined Constraints FIG. 2 illustrates an example flowchart of a method 200 for reducing a number of units in a data population based on predefined constraints. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 110 of FIG. 1), stored on non-transitory, tangible, machine-readable medium (e.g., memory 108 of FIG. 1) that when executed by one or more processors (e.g., processor 104 of FIG. 1) may cause the one or more processors to perform operations 202-226.

At operation 202, the system (e.g., system 100 of FIG. 1) receives a data population (e.g., data population 112 of FIG. 1). The data population includes a plurality of units (e.g., units 114-1 through 114-*n* of FIG. 1). Each unit of the data population includes a plurality of values (e.g., values 118-1 through 118-*m* of FIG. 1), such that each value corresponds to a respective parameter (e.g., parameters 116-1 through 116-*m* of FIG. 1).

In certain embodiments, the data population 112 may include financial data for a plurality of shares and the plurality of parameters 116-1 through 116-*m* may include financial parameters. In other embodiments, the data population 112 may include demographic data for a plurality of persons and the plurality of parameters 116-1 through 116-*m* may include demographic parameters. In yet other embodiments, the data population 112 may include computing data for a plurality of computing nodes of a computing system and the plurality of parameters 116-1 through 116-$m$ may include computing parameters (e.g., a computing performance, a memory, and/or a network bandwidth).

At operation 204, the system receives a plurality of constraints (e.g., constraints 122 of FIG. 1). The constraints may include minimum values (e.g., minimum values 124-1 through 124-$m$ of FIG. 1) and maximum values (e.g., maximum values 126-1 through 126-$m$ of FIG. 1) that correspond to respective parameters.

At operation 206, the system represents units of the data population by first vectors (e.g., vectors 130-1 through 130-$m$ of FIG. 1) in a parameter space (e.g., parameter space 128 of FIG. 1). The parameter space may be a multi-dimensional vector space.

At operation 208, the system determines a holistic feature (e.g., holistic feature 132 of FIG. 1) of the data population. The holistic feature may be determined from all of the units of the data population. In embodiments when the data population includes financial data for a plurality of shares, the holistic feature may be an overall projected gain. In embodiments when the data population includes demographic data for a plurality of persons, the holistic feature may be an overall political lean. In embodiments when the data population includes computing data for a plurality of computing nodes of a computing system, the holistic feature may be an overall memory consumption, an overall network bandwidth, and/or an overall computing performance.

At operation 210, the system represents the holistic feature by a second vector (e.g., vector 134 of FIG. 1) in the parameter space. In certain embodiments, the second vector is a linear combination of the first vectors.

At operation 212, the system defines a volume (e.g., volume 136 of FIG. 1) in the parameter space based on the plurality of constraints. The volume may have a shape of a multi-dimensional (e.g., m-dimensional) rectangle, which may be also referred to as a hyperrectangle or an orthotope.

At operation 214, for each unit of a current data population (e.g., data population 112 of FIG. 1), the system subtracts a vector (e.g., a respective one of vectors 130-1 through 130-$n$ of FIG. 1) representing a respective unit (e.g., a respective one of units 114-1 through 114-$n$ of FIG. 1) from a vector (e.g., vector 134 of FIG. 1) representing a current holistic feature (e.g., holistic feature 132 of FIG. 1) to determine a third vector (e.g., a respective one of vectors 138 of FIG. 1). The third vectors define respective points (e.g., points 140 of FIG. 1) in the parameter space.

At operation 216, for each third vector, the system determines a distance (e.g., a respective one of distances 142 of FIG. 1) between a point (e.g., a respective one of points 140 of FIG. 1) defined by a respective third vector and the volume.

At operation 218, the system determines a minimum distance (e.g., distance 144 of FIG. 1) from determined distances.

At operation 220, The system transforms the current data population into an updated data population (e.g., updated data population 152 of FIG. 1) by removing a unit (e.g., unit 146 of FIG. 1) that corresponds to the minimum distance from the current data population. In other words, the removed unit is a unit of the current data population removal of which moves a vector (e.g., vector 150 of FIG. 1) representing an updated holistic feature (e.g., updated holistic feature 148 of FIG. 1) closest to the volume.

At operation 222, the system determines an updated holistic feature (e.g., updated holistic feature 148 of FIG. 1) of the updated data population. The updated holistic feature is represented by a vector (e.g., vector 150 of FIG. 1). In certain embodiments, the vector representing the updated holistic feature is a linear combination of vectors that represent units of the updated data population.

At operation 224, the system determines if the updated holistic feature is within the volume. In response to determining that the updated holistic feature is not within the volume, method 200 continues to operation 214. In response to determining that the updated holistic feature is within the volume, method 200 continues to operation 226.

At operation 226, the system determines a final data population (e.g., final data population 154 of FIG. 1). In certain embodiments, the final data population is the latest updated data population determined at operation 222. In embodiments when the data population includes financial data for a plurality of shares, the final data population may include data for a maximum number of shares that have the overall projected gain within a desired range defined by the constraints. In embodiments when the data population includes demographic data for a plurality of persons, the final data population may include data for a maximum number of persons that have the overall political lean within a desired range defined by the constraints. In embodiments when the data population includes computing data for a plurality of computing nodes of a computing system, the final data population may include data for a maximum number of nodes that have the overall memory consumption within a desired range defined by the constraints, the overall network bandwidth within a desired range defined by the constraints, and/or the overall computing performance within a desired range defined by the constraints.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory configured to store:
a data population, wherein:
the data population comprises a plurality of units;
each unit comprises a plurality of respective values; and each value corresponds to a respective parameter; and a plurality of constraints, wherein each constraint corresponds to a respective parameter; and a processor communicatively coupled to the memory, wherein the processor is configured to:

receive the data population;

receive the plurality of constraints;

represent the units of the data population by first vectors in a parameter space;

determine a holistic feature of the data population;

represent the holistic feature by a second vector in the parameter space, wherein the second vector is a linear combination of the first vectors;

define a volume in the parameter space based on the plurality of constraints, the volume having a multi-dimensional shape;

(a) for each unit of a current data population, subtract a vector representing a respective unit from a vector representing a current holistic feature to determine a third vector, wherein the vector representing the current holistic feature is a linear combination of vectors that represent units of the current data population;

(b) for each third vector, determine a distance between a point defined by a respective third vector and the volume;

(c) determine a minimum distance from determined distances;

(d) transform the current data population into an updated data population by removing a unit from the current data population that corresponds to the minimum distance from the current data population;

(e) determine an updated holistic feature of the updated data population;

repeat steps (a)-(e) until the updated holistic feature is within the volume; and determine a final data population, the final data population being a subset of the received data population that comprises a maximum number of units of the data population that have the updated holistic feature within the volume.

2. The system of claim 1, wherein a vector representing the updated holistic feature is a linear combination of vectors that represent units of the updated data population.

3. The system of claim 1, wherein the holistic feature is determined based on all of the units of the data population.

4. The system of claim 1, wherein each parameter comprises a financial parameter, a demographic parameter, or a computer parameter.

5. The system of claim 1, wherein each constraint defines a minimum value and a maximum value for a respective parameter.

6. A method comprising:

receiving a data population, wherein:
the data population comprises a plurality of units;
each unit comprises a plurality of respective values; and
each value corresponds to a respective parameter;

receiving a plurality of constraints, wherein each constraint corresponds to a respective parameter;

representing the units of the data population by first vectors in a parameter space;

determining a holistic feature of the data population;

representing the holistic feature by a second vector in the parameter space, wherein the second vector is a linear combination of the first vectors;

defining a volume in the parameter space based on the plurality of constraints, the volume having a multi-dimensional shape;

(a) for each unit of a current data population, subtracting a vector representing a respective unit from a vector representing a current holistic feature to determine a third vector, wherein the vector representing the current holistic feature is a linear combination of vectors that represent units of the current data population;

(b) for each third vector, determining a distance between a point defined by a respective third vector and the volume;

(c) determining a minimum distance from determined distances;

(d) transforming the current data population into an updated data population by removing a unit from the current data population that corresponds to the minimum distance from the current data population;

(e) determining an updated holistic feature of the updated data population;

repeating steps (a)-(e) until the updated holistic feature is within the volume; and determining a final data population, the final data population being a subset of the received data population that comprises a maximum number of units of the data population that have the updated holistic feature within the volume.

7. The method of claim 6, wherein a vector representing the updated holistic feature is a linear combination of vectors that represent units of the updated data population.

8. The method of claim 6, wherein the holistic feature is determined based on all of the units of the data population.

9. The method of claim 6, wherein each parameter comprises a financial parameter, a demographic parameter, or a computer parameter.

10. The method of claim 6, wherein each constraint defines a minimum value and a maximum value for a respective parameter.

11. A non-transitory computer-readable medium storing instructions that, when executed by a processor, cause the processor to:

receive a data population, wherein:
the data population comprises a plurality of units;
each unit comprises a plurality of respective values; and
each value corresponds to a respective parameter;

receive a plurality of constraints, wherein each constraint corresponds to a respective parameter;

represent the units of the data population by first vectors in a parameter space;

determine a holistic feature of the data population;

represent the holistic feature by a second vector in the parameter space, wherein the second vector is a linear combination of the first vectors;

define a volume in the parameter space based on the plurality of constraints, the volume having a multi-dimensional shape;

(a) for each unit of a current data population, subtract a vector representing a respective unit from a vector representing a current holistic feature to determine a third vector, wherein the vector representing the current holistic feature is a linear combination of vectors that represent units of the current data population;

(b) for each third vector, determine a distance between a point defined by a respective third vector and the volume;

(c) determine a minimum distance from determined distances;

(d) transform the current data population into an updated data population by removing a unit from the current data population that corresponds to the minimum distance from the current data population;

(e) determine an updated holistic feature of the updated data population;

repeat steps (a)-(e) until the updated holistic feature is within the volume; and determine a final data population, the final data population being a subset of the received data population that comprises a maximum number of units of the data population that have the updated holistic feature within the volume.

12. The non-transitory computer-readable medium of claim 11, wherein a vector representing the updated holistic feature is a linear combination of vectors that represent units of the updated data population.

13. The non-transitory computer-readable medium of claim 11, wherein each parameter comprises a financial parameter, a demographic parameter, or a computer parameter.

14. The non-transitory computer-readable medium of claim 11, wherein each constraint defines a minimum value and a maximum value for a respective parameter.

\* \* \* \* \*